US012784206B2

(12) United States Patent
Shepherd et al.

(10) Patent No.: US 12,784,206 B2
(45) Date of Patent: Nov. 3, 2026

(54) ANTHROPOMETRY BY TWO-DIMENSIONAL RADIOGRAPHIC IMAGING

(71) Applicants: Hologic, Inc., Marlborough, MA (US); University of Hawaii, Honolulu, HI (US)

(72) Inventors: John A. Shepherd, Honolulu, HI (US); Lambert Thomas Lam King Leong, Honolulu, HI (US); Thomas L. Kelly, Woburn, MA (US)

(73) Assignees: University of Hawaii, Honolulu, HI (US); Hologic, Inc., Marlborough, MA (US)

( * ) Notice: Subject to any disclaimer, the term of this patent is extended or adjusted under 35 U.S.C. 154(b) by 162 days.

(21) Appl. No.: 18/711,165

(22) PCT Filed: Nov. 21, 2022

(86) PCT No.: PCT/US2022/080252
§ 371 (c)(1),
(2) Date: May 17, 2024

(87) PCT Pub. No.: WO2023/097183
PCT Pub. Date: Jun. 1, 2023

(65) Prior Publication Data

US 2025/0029241 A1 Jan. 23, 2025

Related U.S. Application Data

(60) Provisional application No. 63/282,948, filed on Nov. 24, 2021.

(51) Int. Cl.
*G06T 3/06* (2024.01)
*G06N 3/0455* (2023.01)
(Continued)

(52) U.S. Cl.
CPC ......... *G06T 7/0012* (2013.01); *G06N 3/0455* (2023.01); *G06T 3/06* (2024.01); *G06V 10/77* (2022.01); *G06T 2207/10116* (2013.01)

(58) Field of Classification Search
CPC .................... G06T 7/0012; G06T 3/06; G06T 2207/10116; G06T 2207/20084;
(Continued)

(56) References Cited

U.S. PATENT DOCUMENTS

| | | |
|---|---|---|
| 4,811,373 A | 3/1989 | Stein |
| 4,831,527 A | 5/1989 | Clark |

(Continued)

FOREIGN PATENT DOCUMENTS

| | | |
|---|---|---|
| CN | 1767788 | 5/2006 |
| CN | 202723867 | 2/2013 |

(Continued)

OTHER PUBLICATIONS

De Souza et al., "Predicting body measures from 2D images using convolutional neural networks", 2020 International Joint Conference on Neural Networks (IJCNN), IEEE, Jul. 19, 2020 (Jul. 19, 2020), pp. 1-6.

(Continued)

*Primary Examiner* — Stephen P Coleman
(74) *Attorney, Agent, or Firm* — Merchant & Gould P.C.

(57) ABSTRACT

In some examples, anthropometric parameters of a subject are ascertained from radiographic image data. Radiograph image data is transformed to a representation of a lower dimensionality than the dimensionality of the image data by an machine learning processor. The representation of the radio graph image data is mapped to anthropometric parameters, directly or first to an intermediate three-dimensional
(Continued)

optical image of the subject, and then from the intermediate three-dimensional optical image to anthropometric parameters.

20 Claims, 5 Drawing Sheets

(51) Int. Cl.
*G06T 7/00* (2017.01)
*G06V 10/77* (2022.01)
(58) Field of Classification Search
CPC ............ G06T 2207/30196; G06T 7/60; G06N 3/0455; G06V 10/77
USPC .......................................................... 382/132
See application file for complete search history.

(56) References Cited

U.S. PATENT DOCUMENTS 4,947,414 A 8/1990 Stein et al.
4,980,904 A 12/1990 Sones et al.
5,040,199 A 8/1991 Stein
5,305,368 A 4/1994 Bisek et al.
5,335,260 A 8/1994 Arnold
5,771,272 A 6/1998 Berger et al.
5,778,045 A 7/1998 von Stettan
5,949,846 A 9/1999 Stein et al.
6,081,582 A 6/2000 Mazess
6,102,567 A 8/2000 Cabral
6,160,866 A 12/2000 Mazess
6,173,034 B1 1/2001 Chao
6,198,797 B1 3/2001 Majima et al.
6,215,846 B1 4/2001 Mazess
6,233,473 B1 5/2001 Shepherd
6,315,447 B1 11/2001 Nord
6,468,209 B1 10/2002 Heymsfield
6,816,564 B2 11/2004 Charles, Jr.
6,969,350 B1 11/2005 Hawthorne
6,999,549 B2 2/2006 Sabol et al.
7,198,404 B2 4/2007 Navab et al.
7,444,961 B1 11/2008 Ellis
7,595,043 B2 9/2009 Hedrick
7,725,153 B2 5/2010 Kelly et al.
7,801,350 B2 9/2010 L Bras et al.
8,300,911 B1 10/2012 Payne et al.
8,483,458 B2 7/2013 Payne et al.
8,634,629 B2 1/2014 Wilson
8,792,689 B2 7/2014 Kelly et al.
9,086,356 B1 7/2015 Kelly et al.
9,161,727 B2 10/2015 Jenkins
9,179,873 B2 11/2015 Kelly et al.
9,504,406 B2 11/2016 Chetham et al.
9,642,585 B2 5/2017 Wilson
9,865,050 B2 1/2018 Kelly et al.
10,390,784 B2 8/2019 Wilson
10,470,705 B2 11/2019 Kelly
10,499,865 B2 12/2019 Wilson et al.
10,515,451 B2 12/2019 Kelly
10,635,930 B2 4/2020 Geiger et al.
10,646,159 B2 5/2020 Kelly
10,966,678 B2 4/2021 Wilson
11,058,380 B2 7/2021 Wilson
11,625,824 B2 4/2023 Kelly
11,701,079 B2 7/2023 Wilson
11,717,244 B2 8/2023 Wilson
2001/0053202 A1 12/2001 Mazess
2002/0070365 A1 6/2002 Karellas
2004/0077088 A1 4/2004 Charles, Jr. et al.
2004/0101086 A1 5/2004 Sabol et al.
2004/0122311 A1 6/2004 Cosman
2004/0247076 A1 12/2004 Navab et al.
2004/0258301 A1* 12/2004 Payton ................. H04N 19/186
375/E7.181
2005/0010106 A1 1/2005 Lang et al.
2005/0094859 A1 5/2005 Ruth
2005/0215882 A1 9/2005 Chenevert
2006/0074288 A1 4/2006 Kelly et al.
2007/0219226 A1 9/2007 Thorner
2007/0223795 A1 9/2007 Qing et al.
2007/0238957 A1 10/2007 Yared
2009/0279672 A1 11/2009 Reiner
2010/0081960 A1 4/2010 McKenna
2010/0086185 A1 4/2010 Weiss
2010/0168530 A1 7/2010 Chetham
2010/0168551 A1 7/2010 Moller
2010/0234719 A1 9/2010 Kelly et al.
2011/0002522 A1 1/2011 Goto
2011/0058725 A1* 3/2011 Markwardt ............ A61B 6/482
382/132
2011/0158386 A1 6/2011 Payne et al.
2011/0164798 A1 7/2011 Masumoto
2011/0235886 A1 9/2011 Kelly et al.
2011/0311122 A1 12/2011 Kelly
2012/0004570 A1 1/2012 Shimizu
2013/0051523 A1 2/2013 Davydov et al.
2013/0121461 A1 5/2013 Toll
2013/0308752 A1 11/2013 Wilson
2014/0288420 A1 9/2014 Goossen et al.
2014/0371570 A1 12/2014 Davis et al.
2015/0036910 A1 2/2015 Kelly et al.
2015/0146851 A1 5/2015 Wilson
2015/0182180 A9 7/2015 Kelly
2015/0228071 A1 8/2015 Jockel
2015/0374291 A1 12/2015 Kelly et al.
2016/0228057 A1 8/2016 Kelly et al.
2017/0046837 A1 2/2017 Leinhard et al.
2017/0135655 A1 5/2017 Wang et al.
2018/0021001 A1 1/2018 Wilson
2018/0049710 A1 2/2018 Wilson
2018/0189948 A1 7/2018 Kelly
2019/0059829 A1 2/2019 Han
2019/0102877 A1 4/2019 Payne et al.
2020/0029927 A1 1/2020 Wilson
2020/0046307 A1 2/2020 Wilson
2020/0060636 A1 2/2020 Wilson
2020/0167921 A1 5/2020 Kelly
2021/0052243 A1 2/2021 Don et al.
2021/0120255 A1* 4/2021 Fang ......................... G06T 3/40
2021/0150704 A1 5/2021 Bruening et al.
2021/0177368 A1 6/2021 Wilson
2021/0361251 A1 11/2021 Wilson
2022/0225957 A1 7/2022 Kelly
2023/0263498 A1 8/2023 Slagmolen
2023/0306594 A1 9/2023 Kelly
2023/0404507 A1 12/2023 Wilson
2025/0000476 A1 1/2025 Hansroul

FOREIGN PATENT DOCUMENTS

DE 10 20120 204429 9/2013
EP 0747008 12/1996
EP 1882447 1/2008
JP H04-263842 9/1992
JP H09108206 4/1997
JP H10-151127 6/1998
JP 2004-081394 3/2004
JP 2007-524438 8/2007
JP 2010-042129 2/2010
JP 2010-57953 3/2010
JP 2010-510835 4/2010
JP 2010-253049 11/2010
JP 2010-253106 11/2010
JP 2011024773 2/2011
JP 2013-516706 5/2013
JP 6047347 12/2016
JP 2018506385 3/2018
KR 10-2018-0038251 4/2018
WO 2003052398 6/2003
WO 2010/051600 5/2010
WO 2010/095709 8/2012
WO 2014/066906 5/2014
WO 2016/138262 9/2016

(56) References Cited

FOREIGN PATENT DOCUMENTS

| | | |
|---|---|---|
| WO | 2016/177798 | 11/2016 |
| WO | 2017/055352 | 4/2017 |
| WO | 2018192909 | 10/2018 |
| WO | 2022/139874 | 6/2022 |

OTHER PUBLICATIONS

Hayes et al., "DXA: Potential for Creating a Metabolic Map of Organ-Tissue Resting Energy Expenditure Components", Obesity Research vol. 10, No. 10, Oct. 2002, pp. 969-977.

Ho, Chan-Shien et al: "Application of deep learning neural network in predicting bone mineral density from plain X-ray radiography", Archives of Osteoporosis, Springer London, London, vol. 16, No. 1, Oct. 9, 2021, 12 pgs.

Miccini, Riccardo et al: "HRTF Individualization using Deep Learning" 2020 IEEE Conference on Virtual Reality and 3D User Interfaces Abstracts and Workshops (VRW), IEEE, Mar. 22, 2020 (Mar. 22, 2020), pp. 390-395.

PCT International Preliminary Reporton Patentability in Application PCT/US2022/080252, mailed Jun. 9, 2024, 11 pages.

PCT International Search Report and Written Opinion in Application PCT/US2022/080252, mailed Mar. 10, 2023, 19 pages.

Rafael do Espirito Santo, "Principal Component Analysis applied to digital image compression," Einstein (Sao Paulo) 10 (2), Jun. 2012 (available at https://doi.org/10.1590/SI679-45082012000200004), pp. 135-139.

Author Unknown, "National Health and Nutrition Examination Survey (NHANES): Dual Energy Xray Absorptiometry (DXA) Procedures Manual", CDC, Jan. 2017, 115 pages.

Bertin et al., "Measurement of visceral adipose tissue by DXA combined with anthropometry in obese humans," Int J Obes Relat Metab Disord., 24(3):263-270 (Mar. 2000).

Chan, "Performance of Dual-Energy X-ray Absorptiometry in Evaluating Bone, Lean Body Mass, and Fat in Pediatric Subjects", Journal of Bone and Mineral Research, vol. 7 (Year 1992), 7 pgs.

Chan-Shien, Ho, et al., "Application of deep learning neural network in predicting bone mineral density from plain X-ray radiography", Archives of Osteoporosis, Springer, London, vol. 16, No. 1, Oct. 9, 2021, 12 pages.

De Lorenzo, A. et al., "Predicting body cell mass with bioimpedance by using theoretical methods: a technological review", J. Appl. Physiol 1997; 82: 1542-58.

Gronenmeyer et al., "Fast Adipose Tissue (FAT) Assessment by MRI," Magnetic Resonance Imaging, 18:815-818 (2000).

Hayashi et al., "Visceral Adiposity and the Prevalence of Hypertension in Japanese Americans," Circulation, 108:1718-1723 (2003).

Hill et al., "Estimating Abdominal Adipose Tissue With DXA and Anthropometry," Obesity, 15(2):504-510 (Feb. 2007).

Hologic Clarity of Vision, Discovery QDR Series Advanced Point-of-Care Bone Health Assessment, Hologic Osteoporosis Assessment (May 2004), 13 pages.

Hologic Clarity of Vision, Explorer Fan-Beam DXA for the Cost-Conscious Practice, Hologic Osteoporosis Assessment (Jan. 2004), 11 pages.

Jensen et al., "Measurement of abdominal and visceral fat with computed tomography and dual-energy x-ray absorptiometry," Am J Clin Nutr., 61(2):274-278 (Feb. 1995).

Kamel et al., "Usefulness of Anthropometry and DXA in Predicting Intra-abdominal Fat in Obese Men and Women," Obesity Research, 8(1) 36-42 (2000).

Kelly et al., "DXA Body Composition: Theory and Practice," Appl Radia., 49(5:6):511-513 (1988).

Kobayashi et al., "A novel method of measuring intra-abdominal fat volume using helical computed tomography," International Journal of Obesity, 26:398-402 (2002).

Krotkiewski et al., "Impact of Obesity on Metabolism in Men and Women. Importance of Regional Adipose Tissue Distribution," J Clin Invest., The American Society for Clinical Investigation, Inc., 72:1150-1162 (1983).

Kvist et al., "Total and visceral adipose-tissue volumes derived from measurements with computed tomography in adult men and women: predictive equations 1-3," Am J Clin Nutr, 48:1351-1361 (1988).

Lehmann et al., "Generalized Image Combinations in Dual KVP Digital Radiography", Med. Phys. 8(5) Sep./Oct. 1981, 9 pgs.

Ley, "Sex- and menopause-associated changes in body-fat distribution," Am J Clin Nut, 55:950-954 (1993).

Lustgarten, M.S. et al., "Assessment of Analytical Methods Used to Measure Changes in Body Composition in the Elderly and Recommendations for Their Use in Phase II Clinical Trials", J. Nutr. Health Aging, 15(5): 368-375 (2011).

Malkov, S. et al., "Combining 3D optical imaging and dual energy absorptiometry to measure three compositional components", Progress in Biomedical Optics and Imaging, SPIE—Int'l. Society for Optical Engineering, 8937: 893714-893714-6 (2014).

McKiernan F.E., et al. "A long femur scan field does not alter proximal femur bone mineral density measurements by dual-energy X-ray absorptiometry." J Clin Densitom. Jul.-Sep. 2011;14(3):354-8.

Michael et al., "Monte Carlo modelling of an extended DXA technique", Physics in Medicine and Biology, vol. 43, No. 9, Sep. 1, 1998, pp. 2583-2596.

Montague et al., "Perspectives in Diabetes the Perils of Portliness Causes and Consequences of Visceral Adiposity," Diabetes, 49:883-888 (2000).

Morricone et al., "Relationship of Visceral Fat Distribution to Angiographically Assessed Coronary Artery Disease: Results in Subjects With or Without Diabetes or Impaired Glucose Tolerance," PMID: 12616807 [PubMed-indexed for Medline], Nutr Metab Cardiovasc Dis., 12(5):275-283 (2002).

Nicklas et al., "Visceral Adipose Tissue Cutoffs Associated With Metabolic Risk Factors for Coronary Heart Disease in Women," Epidemiology/Health Services/Psychosocial Research, Diabetes Care, 26:1413-1420 (May 2003).

Pietrobelli, A. et al., "Dual-energy X-ray absorptiometry: fat estimation errors due to variation in soft tissue hydration", The American Physiological Society, 1998, vol. 274(5), pp. E808-E816.

Prado, C. et al., "Lean Tissue Imaging: A New Era for Nutritional Assessment and Intervention", Journal of Parental and Enteral Nutrition, 38(8): 940-953 (2014).

Pritchard et al., "Evaluation of Dual Energy X-Ray Absorptiometry as a Method of Measurement of Body Fat," European Journal of Clinical Nutrition, 47:216-228 (1993).

Sanada et al., "A cross-sectional study of sarcopenia in Japanese men and women: Reference values and association with cardiovascular risk factors", European Journal of Applied Physiology 110(1): 57-65, Sep. 2010.

Sayer, A.A. et al., "New horizons in the pathogenesis, diagnosis and management of sarcopenia", Age and Ageing, 42: 145-150 (2013).

Shane, E., et al. "Atypical subtrochanteric and diaphyseal femoral fractures: report of a task force of the American Society for Bone and Mineral Research." J Bone Miner Res. Nov. 2010;25(11):2267-94.

Shane, E., et al."Atypical subtrochanteric and diaphyseal femoral fractures: Second report of a task force of the American society for bone and mineral research." J Bone Miner Res. May 28, 2013. doi: 10.1002/jbmr.1998. [Epub ahead of print], pp. 1-23.

Slosman et al., "Assessment of Whole-Body Composition With Dual-Energy X-Ray Absorptiometry," Radiology, 185:593-598 (1992).

Sorenson, J.A. et al., "Simulation of dual-energy x-ray absorptiometry", Medical Physics, 16(1): 75-80 (1989).

Stein et al., "A Dual-Energy X-Ray Bone Densitometer incorporating an internal reference systems", Workshop on Non-Invasive Bone Measurements, Leuven, Belgium, Sep. 1987, 26 pages.

Tan et al., "Sarcopenia in an Overweight or Obese Patient is an Adverse Prognostic Factor in Pancreatic Cancer", Xlin Cancer Res 2009; 15(22), Nov. 15, 2009, pp. 6973-6979.

Trueth et al., "Estimating Intraabdominal Adipose Tissue in Women by Dual-Energy X-Ray Absorptiometry," Am J Clin Nutr, 62:427-432 (1995).

Wear, J. et al., "CZT detector for dual-energy x-ray absorptiometry (DEXA)", Proceedings of SPIE, 4142: 175-188 (2000).

(56) References Cited

OTHER PUBLICATIONS

WHO publication—Kanis JA, on behalf of the World Health Organisation Scientific Group, "Assessment of osteoporosis at the primary health care level", WHO Collaborating Centre for Metabolic Bone Diseases, University of Sheffield 2007, 339 pgs.
Wilson, J.P et al., "Improved 4-Compartment body-composition model for a clinically accessible measure of total body protein", Am J Clin Nutr. 2013; 97: 497-504.
Wilson, J.P. et al., "Dual-Energy X-Ray absorpitometry-based body volume measurement for 4-compartment body composition", The American Journal of Clinical Nutrition, 2012; 95 (1): 25-31.
Yamada, Yosuke, The appraisal method of Yosuke, and the amount of skeletal muscle and muscular power, medical development, Mar. 1, 2014, vol. 248, No. 9, pp. 670-678, with an English translation summary.
Zimmermann et al., "Detection of overweight and obesity in a national sample of 6-12 year old Swiss children: accuracy and validity of reference values for body mass index from the US Centers for Disease Control and Prevention and the International Obesity Task Force", 2010, Am J Clin Nutr 2004; 79; 838-43.

* cited by examiner

ANTHROPOMETRY BY TWO-DIMENSIONAL RADIOGRAPHIC IMAGING

CROSS-REFERENCE TO RELATED APPLICATION

This application is a National Stage Application of PCT/US2022/080252, filed on Nov. 21, 2022, as a which claims the benefit of priority to U.S. Provisional Patent Application Ser. No. 63/282,948, filed Nov. 24, 2021, the entire disclosures of each of which are incorporated herein by reference in its their entireties. To the extent appropriate, a claim of priority is made to each of the above disclosed applications.

BACKGROUND

Anthropometry is the measurement of body size, structure, and composition. Anthropometry is useful in a wide range of applications. For example, Anthropometry is used to define diagnostic criteria for obesity and is used to gauge risk of cardiovascular diseases, hypertension, diabetes mellitus, and other obesity related health problems. Anthropometry can be used to ascertain nutritional status in subjects, including children and pregnant women. Additionally, anthropometric measurements can be used as a baseline for physical fitness, to evaluate the effects of weight loss and physical training interventions, to evaluate abnormal fluid accumulation in edema and lymphedema, and to estimate athletic prowess in the human performance space. Efforts are ongoing to improve anthropometry, including its efficiency and accuracy.

SUMMARY

In an aspect of the current disclosure, a method of determining anthropometric parameters of a subject includes acquiring a first data set representing a radiographic image (such as an X-ray image or a dual-energy X-ray absorptiometry (DXA) image) of the subject, the first data having a first dimensionality, transforming, using a processor, the first data set to a second data set having a second dimensionality, the second dimensionality being lower than the first dimensionality, and mapping, using the processor, the second data set to a third data set, the third data set representing a set of anthropometric parameters and having a third dimensionality. In examples of the above aspect, the processor includes an encoder portion of an autoencoder trained to compress and reconstruct X-ray or DXA images of human bodies. The processor in some embodiments also includes a decoder portion of an autoencoder trained to compress 3-dimensional ("3D") images of human bodies, and reconstruct the 3D images or obtain anthropometric data of the imaged human bodies (either directly from reconstructed 3D images or directly from the compressed 3D images).

In other examples of the above aspect, acquiring the first data set includes acquiring the first data set representing a radiographic image of a sub-region of a body of the subject. In another example, acquiring the first data set representing a radiographic image of the sub-region of the body includes acquiring the first data set representing at least one of an arm, a thigh, a torso, a foreleg, a forearm, and a head.

In another aspect of the current disclosure, a system for determining anthropometric parameters of a subject includes: an radiographic imaging device configured to acquire a radiographic image of the subject; a processor; and a memory coupled to the processor, the memory storing instructions that, when executed by the processor, perform a set of operations including receiving from the radiographic imaging device a first data set representing a radiographic image of the subject, the first data having a first dimensionality; transforming the first data set to a second data set having a second dimensionality, the second dimensionality being lower than the first dimensionality; and mapping the second data set to a third data set, the third data set representing a set of anthropometric parameters and having a third dimensionality.

In other examples of the above aspect, the set of instructions includes acquiring the first data set by acquiring the first data set representing a radiographic image of a sub-region of a body of the subject. In another example, the set of instructions includes acquiring the first data set representing a radiographic image of the sub-region of the body by acquiring the first data set representing at least one of an arm, a thigh, a torso, a foreleg, a forearm, and a head.

In some embodiments, a non-transient, computer-readable memory device storing instructions executable by a processor to perform a method that includes: receiving a first data set representing a radiographic image of the subject, the first data having a first dimensionality; transforming the first data set to a second data set having a second dimensionality, the second dimensionality being lower than the first dimensionality; and mapping the second data set to a third data set, the third data set representing a set of anthropometric parameters and having a third dimensionality.

DETAILED DESCRIPTION

Figure 1:
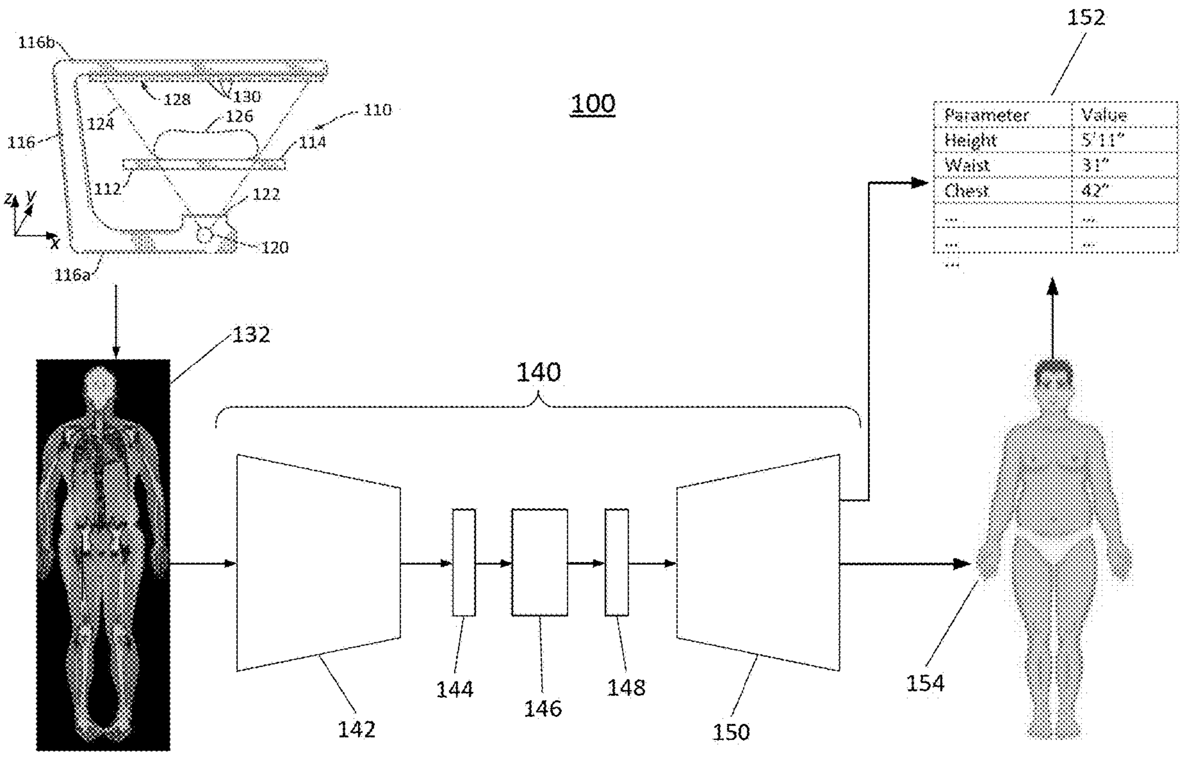
FIG. 1 shows schematically a system for determining anthropometric parameters of a subject based on radiographic image and/or measurements of the subject according to some embodiments.

This disclosure relates to anthropometric measurements. Anthropometry is the measurement of body size, structure, and composition. Besides height, weight, and BMI, core elements of anthropometry include body circumferences (arm, waist, hip, thigh and calf) and muscle circumferences (arm, thigh, calf). Body areas and volumes are also measured, as well as linear dimensions including arm and leg length, arm span, and biiliocristal and biacromial breadths are also measured. Anthropometry finds a wide range of applications. For example, it defines the diagnostic criteria for obesity and is used to gauge risk of CVD, hypertension, diabetes mellitus, and other obesity related health problems. Anthropometry has further utility as a measure of nutritional status in children and pregnant women. Additionally, anthropometric measurements can be used as a baseline for physical fitness, to evaluate the effects of weight loss and physical training interventions, to evaluate abnormal fluid accumulation in edema and lymphedema, and to estimate athletic prowess in the human performance space.

Conventionally, anthropometric measurements can be obtained by direct measurement using a variety of tools and instruments, such as rulers, tape measures, and 3D optical scanners. However, the process of determining anthropometric measurements can be tedious and time-consuming, as in cases where manual measurements of numerous (e.g., tens or hundreds of) anthropometric parameters are to be made, or economically inefficient, as in cases where expensive, dedicated instruments, such as 3D optical scanners, are used for such measurements.

Accordingly, a technical problem exists in that determining anthropometric measurements can be tedious and time-consuming because of the large number of anthropometric measurements to be performed. Determining anthropometric measurements may also be economically inefficient because of the expensive instruments typically needed to perform such measurements.

In various examples, a technical solution to the above technical problem includes determining anthropometric parameters via, e.g., DXA imaging, and by using principal component analysis (PCA) or artificial intelligence to reconstruct the shape of the human body, or the shape of a portion of the human body such as, e.g., an arm, a thigh, a torso, or a head. While DXA may be utilized in the technologies described int his disclosure, the use of DXA is described primarily for clarity herein.

In some embodiments disclosed in the present disclosure, radiographic imaging and/or analytical instruments, such as X-ray imaging apparatuses or DXA imaging apparatuses, which are commonly used for diagnostic purposes, are used to determine anthropometric parameters. Anthropometric parameters are ascertained by a processor either directly from radiographic images, such as two-dimensional ("2D") X-ray or DXA images, or derived from intermediate reconstructed 3D optical images. In some embodiments, the processor includes one or more machine learning processors, such as convolution neural networks ("CNN") that are trained to compress and/or reconstruct images.

In an example embodiment, as schematically shown in FIG. 1, a system 100 for determining anthropometric parameters of a subject 126 includes a radiographic imaging apparatus 110 for acquiring image data of the subject 126 and one or more processors for generating anthropometric parameters based on the image data. In some embodiments, the one or more processors include a machine learning processor 140.

The radiographic imaging apparatus 110 is an X-ray imaging apparatus. For example, the radiographic imaging apparatus 110 can be a DXA imaging apparatus. As shown in FIG. 1, a DXA imaging apparatus 110 includes a table 112 having a support surface 114 that can be considered horizontal and planar in this simplified explanation and illustration which is not necessarily accurate in scale or geometry, and which is used here solely to illustrate and explain certain principles of operation. A human subject 126 is positioned on surface 114. The length of the subject is along a horizontal longitudinal axis defined as the y-axis and the subject's arms are spaced from each other along the x-axis. A C-arm 116 has portions 116*a* and 116*b* extending below and above table 112, respectively, and is mounted in a suitable structure (not shown expressly) for moving at least parallel to the y-axis along the length of the subject 126. Lower portion 116*a* of the C-arm 116 carries an X-ray source 120 that can emit X-rays limited by an aperture 122 into a fan-shaped distribution 124 conforming to a plane perpendicular to the y-axis. The energy range of the X-rays can be relatively wide, to allow for the known DXA dual-energy X-ray measurements, or can be filtered or generated in a narrower range to allow for single energy X-ray measurements. The X-ray distribution can be continuous within the angle thereof or can be made up, or considered to be made up, of individual narrower beams. The X-ray distribution 124 can encompass the entire width of the subject as illustrated, or it can have a narrower angle so the entire subject can be covered only by several passes along the y-axis and the X-ray measurements from the several passes can be combined as is known in the art to simulate the use of a wider fan beam, as typical in current commercial DXA imaging apparatus. Alternatively, a single, pencil-like beam of X-rays can be used to scan selected regions of the subject's body, e.g. in a raster pattern.

The X-ray radiation impinges on X-ray detector 128, which can include one or more linear arrays of individual X-ray elements 30, each linear array extending in the x-direction, or a continuous detector where measurements for different positions along the detector can be defined in some manner known in the art, or can be another form of detector of X-rays. C-arm 116 can move at least along the y-axis, or can be maintained at any desired position along that axis. For any one position, or any one unit of incremental travel in the y-direction of arm 116, detector 128 can produce one or several lines of raw X-ray data. Each line can correspond to a row of pixels in a resulting image, with each row extending in a direction corresponding to the x-direction. Each line corresponds to a particular position, or range of positions, of the C-arm in its movement along the y-axis and/or a particular linear detector, and includes a number of individual measurements, each for a respective detector element position in the line, i.e., represents attenuation that the X-rays have experienced in traveling from source 120 to a respective detector element position over a specified time interval. A DXA imaging apparatus takes a higher X-ray energy measurement H and a lower X-ray energy measurement L from each detector element position, and carries out initial processing known in the art to derive, from the raw X-ray data, a set of pixel values, or image data 132, for a projection image. Each pixel value includes a high energy value H and a low energy value L. This can be achieved by rapidly alternating the energy level of the X-rays from source 120 between a higher and a lower range of X-ray energies, for example by rapidly rotating or otherwise moving a suitable filter in or out of the X-rays before they reach the subject 126, or by controlling the X-ray tube output, and/or by using an X-ray detector 128 that can discriminate between energy ranges to produce H and L measurements for each pixel position, e.g. by having a low energy and a high energy detector element side-by-side or on top of each other for respective positions in the detector array. The H and L X-ray measurements for the respective pixel positions are computer-processed as known in the art to derive estimates of various parameters, including, if desired, body composition measurements of total and segmental total mass, fat mass, and lean mass.

In some embodiments, the machine learning processor 140 includes a data compression module 142, which receives the image data 132 generated by the radiation imaging apparatus 110 and reduces the dimensionality of the image data to generate compressed (i.e., of reduced dimensionality) representation, or code, 144 of the image data. The machine learning processor in some embodiments further includes a mapping module 146, which transforms the compressed representation 144 of the radiographic image data 132 to compressed representation, or code, 148 of 3D optical image data. In some embodiments, the machine learning processor further includes a reconstruction module 150, which uses the 3D optical image code 148 to generate a set of anthropometric parameters 152. The anthropometric parameters 152 can be generated directly from the 3D optical image code 148; alternatively, the reconstruction module 150 can be configured to generate 3D optical image data 154 from the 3D optical image code, and anthropometric parameters 152 can be readily computed from the 3D optical image data 154.

In some embodiments, reconstruction module 150 can be configured to generate anthropometric parameters 152 or 3D optical image data 154 directly from the radiographic image data 144 without mapping transforming radiographic image code 144 to 3D optical image code 148, as described below.

The data compression module 142 in some embodiments is implemented by a processor configured, such as a digital processor, programmed to carry out image compression using principal component analysis ("PCA"). The PCA technique allows the identification of standards (principal components) in data and their expression in such a way that their similarities and differences are emphasized. Once patterns are found, the data can be compressed, i.e., their dimensions can be reduced (by retaining only some of the principal components) without much loss of information. Image compression using PCA is known in the art. See, for example, Rafael do Espírito Santo, "Principal Component Analysis applied to digital image compression," Einstein (São Paulo) 10 (2), June 2012 (available at https://doi.org/10.1590/S1679-45082012000200004), which is incorporated in the present disclosure by reference. Using PCA, the data compression module 142 thus generates a code 144, which is of a lower dimensionality than that of the image data 132. A reconstructed image that is a linear (vector) representation of the radiographic image data 132, with the retained principal components as bases, can be generated.

In various examples, X-ray energy measurements may be taken, and image data may be generated, for portions or sub-regions of the entire body of the subject 126, as opposed to the generating image data for the entire body. For example, X-ray energy measurements may be taken for sub-regions of the body such as limbs or, e.g., a left arm, a right arm, a left thigh, a right thigh, a forearm, a foreleg, a torso, a trunk, or a head of the subject 126. Similarly to the image 132 discussed above which covers the entire body of the subject 126, an image 132 may be generated for any sub-region of the body of the subject 126 such as, e.g., a limb as discussed in the examples discussed above. In various examples, the data compression module 142 of the machine learning processor 140 receives the image data 132 of a sub-region of the body of the subject 126 and reduces the dimensionality of the image data to generate compressed (i.e., of reduced dimensionality) representation, or code, 144 of the image data of the sub-region of the body of the subject 126. The mapping module 146 may then transform the compressed representation 144 of the radiographic image data 132 of the sub-region of the body of the subject 126 to compressed representation, or code, 148 of 3D optical image data. In examples, the reconstruction module 150 may use the 3D optical image code 148 to generate a set of anthropometric parameters 152 of the sub-region of the body of the subject 126. The anthropometric parameters 152 of the sub-region of the body of the subject 126 may be generated directly from the 3D optical image code 148; alternatively, the reconstruction module 150 may be configured to generate 3D optical image data 154 from the 3D optical image code, and anthropometric parameters 152 of the sub-region of the body of the subject 126 can be readily computed from the 3D optical image data 154.

In various examples, the data compression module 142 may use PCA to generate the code 144 when the image to be analyzed is the image of a sub-region or a limb of the subject 126. In examples, reconstructing the image 154 of a given sub-region or limb may be performed with better accuracy when the image data 132 is an image data of the same sub-region or limb. For example, if image data 132 is the image data of a left arm, then the accuracy of the reconstructed image 154 of the same left arm is increased compared to the same reconstructed image 154 of the left arm if the image data 132 is the image data of the entire body of the subject 126. Accordingly, it may be advantageous to start from the image data 132 of the limb or sub-region that is to be reconstructed to generate reconstructed image data 154 of the same sub-region or limb.

In other examples, DXA data may be used to determine volumetric information of the entire body of the subject 126 or of a sub-region of the body of the subject 126. For example, DXA measurements may be performed on the head of the subject 126, and the DXA measurements may be used to determine the volume of the brain of the subject 126. Alternatively, an artificial neural network (ANN), such as an artificial intelligence convolutional neural network (AI-CNN), may also be used to implement the data compression at the data compression module 142 for sub-regions of the body of the subject 126. In examples, using AI-CNN may include training the neural network on a number of sub-regions of bodies, or on entire bodies.

In some embodiments, the data compression module 142 is implemented by an ANN such as AI-CNN. In some embodiments, the AI-CNN is the encoder portion of an autoencoder (having an encoder portion and a decoder portion) trained on radiographic images. The encoder portion of an autoencoder transforms input radiographic image data to data of a lower dimension ("code"), and the decoder portion generates a reconstructed image. An autoencoder can be trained, for example, by inputting into the encoder portion image data 132 of multiple radiographic images. The AI-CNN adjusts itself (weights of the nodes in the AI-CNN) until the reconstructed images are sufficiently close facsimiles of the respective input images.

In some embodiments, the reconstruction module 150 is a processor configured, such as a digital processor programmed, to perform linear image reconstruction from code 148, i.e., perform vector operations (e.g., rotations and translations) to render the pixel values of the reconstructed 3D optical images based on the retained principal components. Alternatively, or in addition, the reconstruction module 150 is configured to determine the anthropometric parameters directly from the code 148 or from the reconstructed 3D optical image.

In some embodiments, the reconstruction module 150 is implemented by an ANN, such as an AI-CNN. In some embodiments, the AI-CNN is the decoder portion of an autoencoder (having an encoder portion and a decoder portion) trained on 3D optical images. The encoder portion of an autoencoder transforms input 3D optical image data to data of a lower dimension ("code"), and the decoder portion generates a reconstructed 3D optical image or anthropometric parameters corresponding to the 3D optical image. An autoencoder can be trained, for example, by inputting into the encoder portion image data of multiple 3D optical images. The AI-CNN adjusts itself (weights of the nodes in the AI-CNN) until the reconstructed images are sufficiently close facsimiles of the respective input 3D optical images, or the generated anthropometric parameters are sufficiently close to those determined directly from the actual 3D images.

Figure 2:
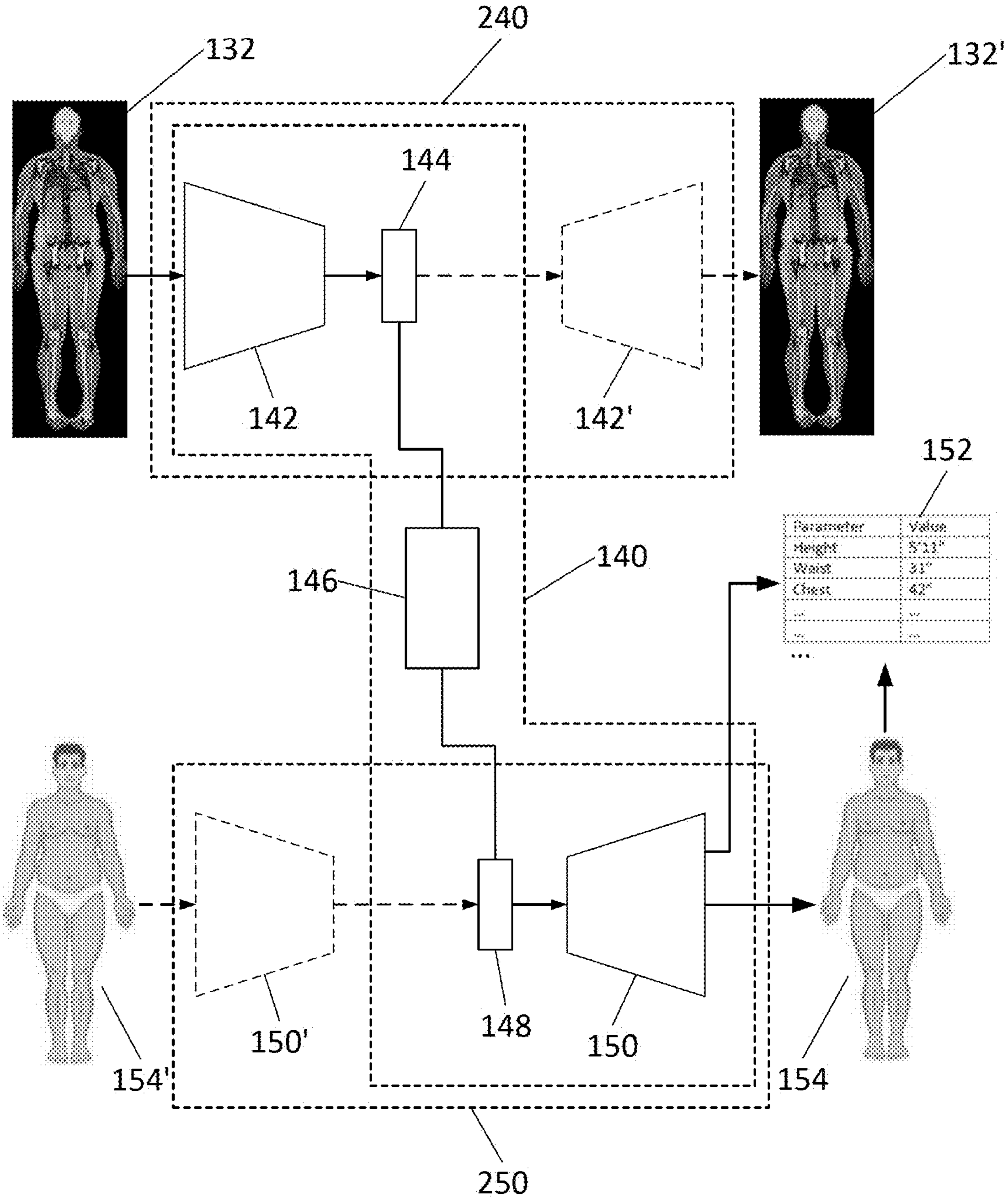
FIG. 2 depicts schematically components of a processor for determining anthropometric parameters of a subject according to some embodiments.

In some embodiments, the machine learning processor 140 is constructed with the compression module of a machine learning processor for compressing and reconstructing radiographic images, and the reconstruction module of a machine learning processor for compressing and reconstructing 3D optical images (deriving anthropometric parameters). In the example illustrated in the FIG. 2, a first machine learning processor 240 is configured to compress radiographic image data 132 into a code 144 and reconstruct from the code 144 radiographic image data 132'. A second machine learning processor 250 is configured to compress 3D optical image data 154' into a code 148 and reconstruct from the code 148 3D optical image data 154, or derive anthropometric parameters 152. For example, the first machine learning processor 240 can be an autoencoder, with an encoder portion 142 and decoder portion 142'; in another example, the first machine learning processor 240 can be a PCA processor, with PCA compression portion 142 and PCA reconstruction portion 142'. Similarly, the second machine learning processor 250 can be an autoencoder, with an encoder portion 150' and decoder portion 150; alternatively, the second machine learning processor 250 can be a PCA processor, with PCA compression portion 150' and PCA reconstruction portion 150. The machine learning processor 140 in some embodiments include the compression module 142 from the first machine learning processor 240 and reconstruction module 150 from the second machine learning processor 250, with a mapping module 146 converting the radiographic code 144 to 3D optical code 148.

The mapping module 146 in some embodiments is a processor, such as a digital processor, configured (programmed) to perform linear transformation, i.e., solve a set of linear equations, or perform a matrix operation on the radiographic image codes to obtain 3D optical image codes, which are used to reconstruct 3D optical images. The coefficients of the linear equations, or matrix, can be determined by solving the set of linear equations with radiographic image codes and 3D optical image codes of the same subjects, respectively. In other embodiments, mapping module 146 is a machine learning processor, such as an ANN, trained on radiographic image codes and 3D optical image codes.

Because the mapping module 146 operates on a reduced-dimension representation of the radiographic image data, the mapping module 146 is structurally simpler and/or requires less memory than for mapping uncompressed image data.

Instead of a reduced-dimension representation of 3D optical image data, code 148 is a reduced-dimension representation of anthropometric parameters, such that the reconstruction module 150 output anthropometric parameters directly, without first reconstructing 3D optical images. The mapping module 146 transforms the radiographic image codes into codes for anthropometric parameters instead of codes for 3D optical images.

Figure 3:
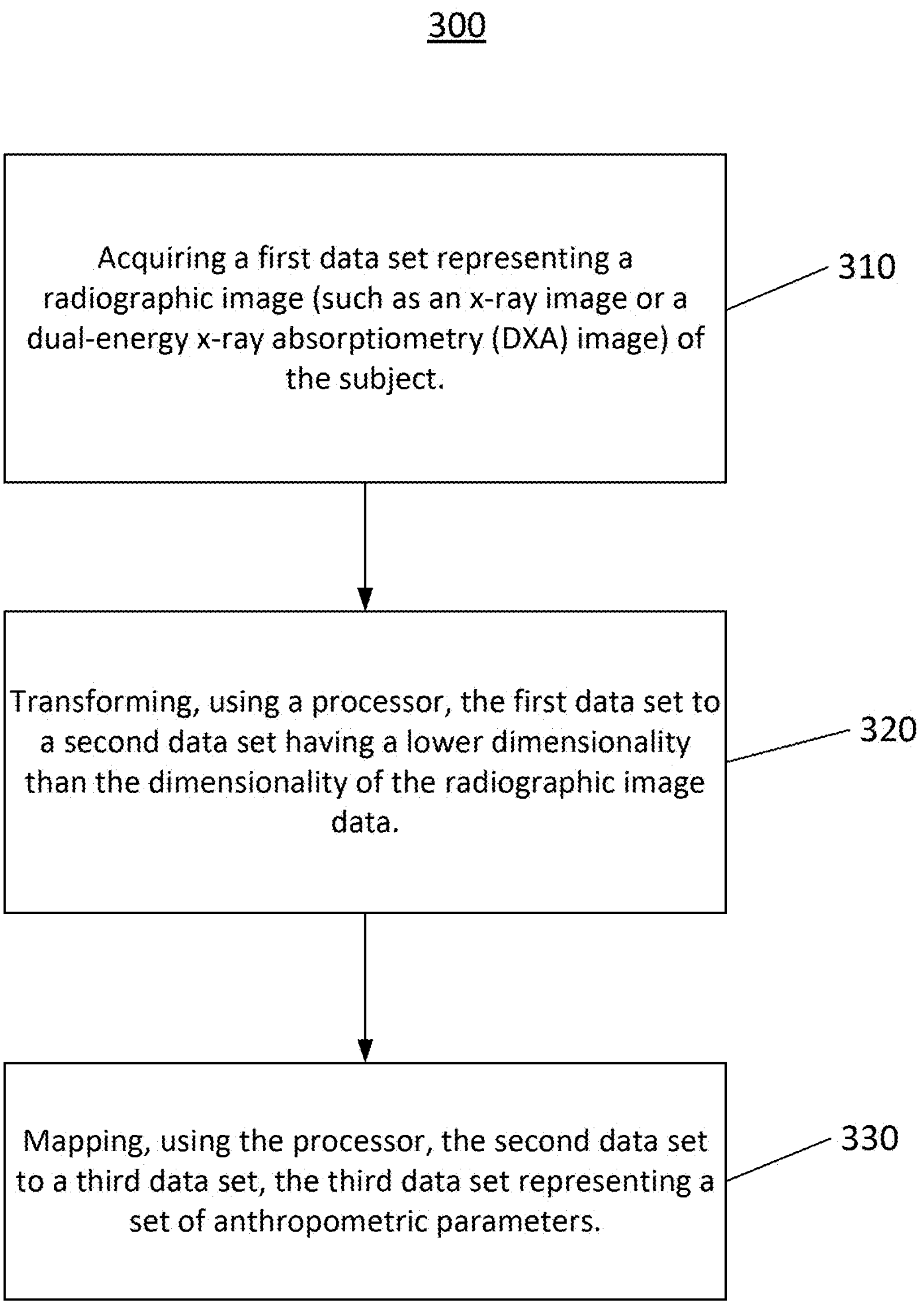
FIG. 3 outlines a method determining anthropometric parameters of a subject according to some embodiments.

In operation, the system described above performs a method of determining anthropometric parameters of a subject as outlined in FIG. 3 in some embodiments. The method includes: acquiring 310 a first data set representing a radiographic image (such as an X-ray image or a DXA image) of the subject; transforming 320, using a processor, the first data set to a second data set having a lower dimensionality than the dimensionality of the radiographic image data; and mapping 330, using the processor, the second data set to a third data set, the third data set representing a set of anthropometric parameters.

Figure 4:
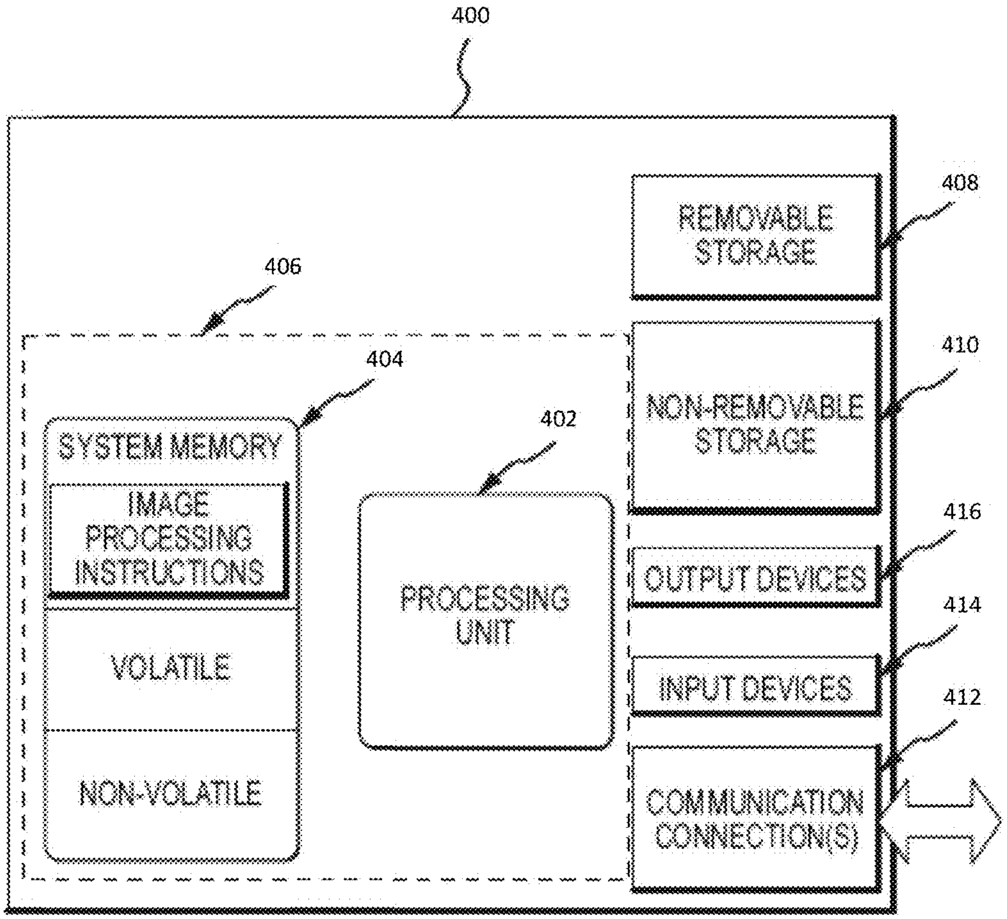
FIG. 4 shows schematically an example of a suitable operating environment in which one or more examples in the present disclosure can be implemented.

FIG. 4 illustrates one example of a suitable operating environment in which one or more of the present embodiments can be implemented. This operating environment may be incorporated directly into a scanning system, or may be incorporated into a computer system discrete from, but used to control, a scanning system such as described herein. This is only one example of a suitable operating environment and is not intended to suggest any limitation as to the scope of use or functionality. Other well-known computing systems, environments, and/or configurations that can be suitable for use include, but are not limited to, personal computers, server computers, hand-held or laptop devices, multiprocessor systems, microprocessor-based systems, programmable consumer electronics such as smart phones, network PCs, minicomputers, mainframe computers, tablets, distributed computing environments that include any of the above systems or devices, and the like.

In its most basic configuration, operating environment 400 typically includes at least one processing unit 402 and memory 404. The processing unit 402 can include both digital processors and analogue processors, such as neural networks. Depending on the exact configuration and type of computing device, memory 404 (storing, among other things, instructions to perform the image acquisition and processing methods disclosed herein) can be volatile (such as RAM), non-volatile (such as ROM, flash memory, etc.), or some combination of the two. This most basic configuration is illustrated in FIG. 4 by dashed line 406. Further, environment 400 can also include storage devices (removable, 408, and/or non-removable, 410) including, but not limited to, magnetic or optical disks or tape. Similarly, environment 400 can also have input device(s) 414 such as touch screens, keyboard, mouse, pen, voice input, etc., and/or output device(s) 416 such as a display, speakers, printer, etc. Also included in the environment can be one or more communication connections 412, such as LAN, WAN, point to point, Bluetooth, RF, etc.

Operating environment 400 typically includes at least some form of computer readable media. Computer readable media can be any available media that can be accessed by processing unit 402 or other devices including the operating environment. By way of example, and not limitation, computer readable media can include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other tangible medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 400 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some embodiments, the components described herein include such modules or instructions executable by computer system 400 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, computer system 400 is part of a network that stores data in remote storage media for use by the computer system 400.

Figure 5:
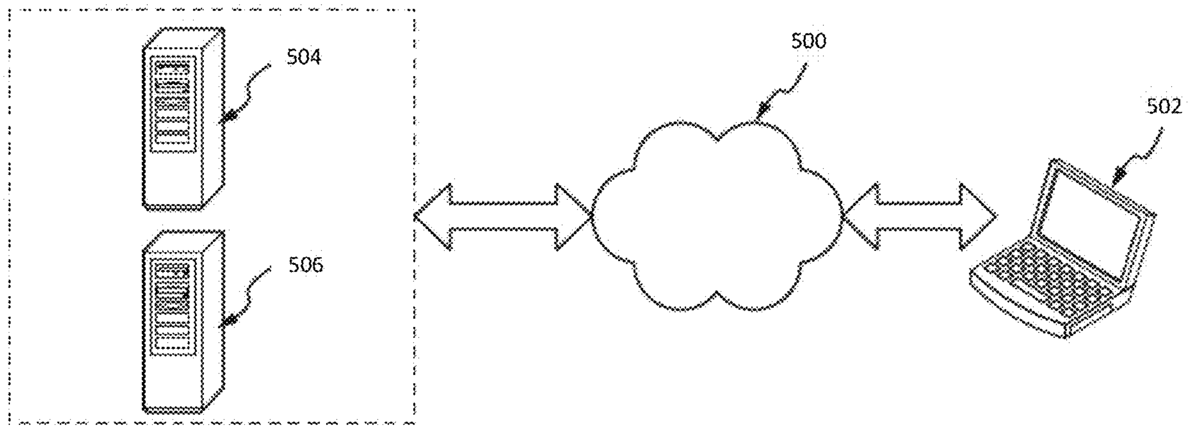
FIG. 5 schematically illustrates a network in which the various systems and methods herein may operate according to some embodiments.

FIG. 5 is an embodiment of a network 500 in which the various systems and methods disclosed herein may operate. In embodiments, a client device, such as client device 502, may communicate with one or more servers, such as servers 504 and 506, via a network 508. In embodiments, a client device may be a laptop, a personal computer, a smart phone, a PDA, a netbook, or any other type of computing device, such as the computing device in FIG. 4. In embodiments, servers 504 and 506 may be any type of computing device, such as the computing device illustrated in FIG. 4. Network 508 may be any type of network capable of facilitating communications between the client device and one or more servers 504 and 506. Examples of such networks include, but are not limited to, LANs, WANs, cellular networks, and/or the Internet.

In embodiments, the various systems and methods disclosed herein may be performed by one or more server devices. For example, in one embodiment, a single server, such as server 504 may be employed to perform the systems and methods disclosed herein, such as the method for scanning and image processing. Client device 502 may interact with server 504 via network 508. In further embodiments, the client device 502 may also perform functionality disclosed herein, such as scanning and image processing, which can then be provided to servers 504 and/or 506.

In alternate embodiments, the methods and systems disclosed herein may be performed using a distributed computing network, or a cloud network. In such embodiments, the methods and systems disclosed herein may be performed by two or more servers, such as servers 504 and 506. Although a particular network embodiment is disclosed herein, one of skill in the art will appreciate that the systems and methods disclosed herein may be performed using other types of networks and/or network configurations.

The examples disclosed in the present disclosure utilize radiographic imaging data to ascertain anthropometric measurements without resort to a separate imaging apparatus, such as a 3D optical scanner. With the example embodiments, diagnostic imaging apparatuses, such as X-ray or DXA imagers, which are commonly used to determine a variety of conditions, such as fat/muscle content, can be used at the same time to ascertain anthropometric parameters, some of which are not readily ascertainable by other modalities. A more efficient, complete, and accurate assessment of a subject's physical condition is thus achieved.

In various examples, notwithstanding the appended claims, the disclosure is also defined by the following clauses:

Clause 1. A method of determining anthropometric parameters of a subject, the method including acquiring a first data set representing a radiographic image of the subject, the first data having a first dimensionality; transforming, using a processor, the first data set to a second data set having a second dimensionality, the second dimensionality being lower than the first dimensionality; and mapping, using the processor, the second data set to a third data set, the third data set representing a set of anthropometric parameters and having a third dimensionality.

Clause 2. The method of clause 1, wherein acquiring the first data set includes acquiring an X-ray image data set.

Clause 3. The method of clause 1 or clause 2, wherein acquiring an X-ray image data set includes acquiring a dual-energy X-ray absorptiometry (DXA) image data set.

Clause 4. The method of any one of clauses 1-3, wherein transforming the first data set to the second data set includes performing machine learning.

Clause 5. The method of any one of clauses 1-4, wherein transforming the first data set to the second data set includes performing, using the processor, a principal component analysis on the first data set.

Clause 6. The method of clause 4 or clause 5, wherein performing machine learning includes performing machine learning using an artificial intelligence convolutional neural network (AI CNN).

Clause 7. The method of any one of clauses 1-6, wherein mapping the second data set to a third data set includes mapping, using the processor, the second data set to a fourth data set, the fourth data set having a fourth dimensionality that is lower than the third dimensionality; and transforming, using the processor, the fourth data set to the third data set.

Clause 8. The method of clause 7, wherein transforming the fourth data set to the third data set includes transforming the fourth data set using an inverse PCA.

Clause 9. The method of clause 7 or clause 8, wherein transforming the fourth data set to the third data set includes transforming the fourth data set using an artificial intelligence convolutional neural network (AI CNN).

Clause 10. The method of any one of clauses 7-9, wherein transforming the first data set to the second data set includes transforming the first data set according to a projected relationship between the first data set and the second data set, the projected relationship being determined based at least in part on one or more data sets representing preexisting radiographic images; and transforming the fourth data set to the third data set includes transforming the four data set according to a projected relationship between the four data set and the third data set based at least in part on an analysis of one or more data sets representing preexisting optical images.

Clause 11. The method of clause 10, wherein transforming the first data set to the second data set includes transforming the first data set using an encoder in a first autoencoder trained on the one or more data sets representing preexisting radiographic images; and transforming the fourth data set to the third data set includes transforming the fourth data set using a decoder in an autoencoder trained on the one or more data sets representing preexisting optical images.

Clause 12. The method of clause 10 or clause 11, further including analyzing a plurality of preexisting radiographic images to arrive at the projected relationship between the first data set and the second data set.

Clause 13. The method of clause 12, further including analyzing a plurality of preexisting optical images to arrive at the projected relationship between the four data set and the third data set.

Clause 14. The method of any one of clauses 7-13, wherein mapping the second data set to the fourth data set includes mapping, using a vector-matrix multiplication circuit in the processor, the second data set to the fourth data.

Clause 15. The method of any one of clauses 1-14, wherein acquiring the first data set comprises acquiring the first data set representing a radiographic image of a sub-region of a body of the subject.

Clause 16. The method of clause 15, wherein acquiring the first data set representing a radiographic image of the sub-region of the body comprises acquiring the first data set representing at least one of an arm, a thigh, a torso, a foreleg, a forearm, and a head.

Clause 17. A system for determining anthropometric parameters of a subject, the system including a radiographic imaging device configured to acquire a radiographic image of the subject; a processor; and a memory operatively coupled to the processor, the memory storing instructions readable by the processor, the instructions, when read by the processor, causing the processor to perform a process, including receiving from the radiographic imaging device a first data set representing a radiographic image of the subject, the first data having a first dimensionality; transforming the first data set to a second data set having a second dimensionality, the second dimensionality being lower than the first dimensionality; and mapping the second data set to a third data set, the third data set representing a set of anthropometric parameters and having a third dimensionality.

Clause 18. The system of clause 17, wherein acquiring the first data set includes acquiring an X-ray image data set.

Clause 19. The system of clause 18, wherein acquiring an X-ray image data set includes acquiring a dual-energy X-ray absorptiometry (DXA) image data set.

Clause 20. The system of any one of clauses 17-19, further including an output device operatively coupled to the processor, wherein the process further includes generating at the output device an output indicative of one or more of the anthropometric parameter represented by the third data set.

Clause 21. The system of any one of clauses 17-20, wherein the set of instructions comprises acquiring the first data set by acquiring the first data set representing a radiographic image of a sub-region of a body of the subject.

Clause 22. The system of any one of clauses 17-21, wherein the set of instructions comprises acquiring the first data set representing a radiographic image of the sub-region of the body by acquiring the first data set representing at least one of an arm, a thigh, a torso, a foreleg, a forearm, and a head.

Clause 23. A non-transient, computer-readable memory device storing instructions executable by a processor to perform a method including, receiving a first data set representing a radiographic image of the subject, the first data having a first dimensionality; transforming the first data set to a second data set having a second dimensionality, the second dimensionality being lower than the first dimensionality; and mapping the second data set to a third data set, the third data set representing a set of anthropometric parameters and having a third dimensionality.

Clause 24. The memory device of clause 23, wherein mapping the second data set to a third data set includes mapping, using the processor, the second data set to a fourth data set, the fourth data set having a fourth dimensionality that is lower than the third dimensionality; and transforming, using the processor, the fourth data set to the third data set.

The embodiments described herein can be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices can be employed to perform the functionality disclosed herein without departing from the scope of the disclosure.

This disclosure describes some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A method of determining anthropometric parameters of a subject, the method comprising:

acquiring a first data set representing a radiographic image of the subject, the first data having a first dimensionality;

transforming, using a processor, the first data set to a second data set having a second dimensionality, the second dimensionality being lower than the first dimensionality wherein the second data set is a compressed version of the first data set; and mapping, using the processor, the second data set to a third data set, the third data set representing a set of anthropometric parameters and having a third dimensionality wherein the third data set is a compressed representation of a 3D optical image data.

2. The method of claim 1, wherein acquiring the first data set comprises acquiring an X-ray image data set.

3. The method of claim 1, wherein transforming the first data set to the second data set comprises performing machine learning.

4. The method of claim 1, wherein transforming the first data set to the second data set comprises performing, using the processor, a principal component analysis on the first data set.

5. The method of claim 1, wherein mapping the second data set to a third data set comprises:

mapping, using the processor, the second data set to a fourth data set, the fourth data set having a fourth dimensionality that is lower than the third dimensionality; and transforming, using the processor, the fourth data set to the third data set.

6. The method of claim 5, wherein transforming the fourth data set to the third data set comprises transforming the fourth data set using an inverse PCA.

7. The method of claim 5, wherein:

transforming the first data set to the second data set comprises transforming the first data set according to a projected relationship between the first data set and the second data set, the projected relationship being determined based at least in part on one or more data sets representing preexisting radiographic images; and transforming the fourth data set to the third data set comprises transforming the four data set according to a projected relationship between the fourth data set and the third data set based at least in part on an analysis of one or more data sets representing preexisting optical images.

8. The method of claim 7, wherein:

transforming the first data set to the second data set comprises transforming the first data set using an encoder in a first autoencoder trained on the one or more data sets representing preexisting radiographic images; and transforming the fourth data set to the third data set comprises transforming the fourth data set using a decoder in an autoencoder trained on the one or more data sets representing preexisting optical images.

9. The method of claim 7, further comprising analyzing a plurality of preexisting radiographic images to arrive at the projected relationship between the first data set and the second data set.

10. The method of claim 9, further comprising analyzing a plurality of preexisting optical images to arrive at the projected relationship between the fourth data set and the third data set.

11. The method of claim 5, wherein mapping the second data set to the fourth data set comprises mapping, using a vector-matrix multiplication circuit in the processor, the second data set to the fourth data.

12. The method of claim 1, wherein acquiring the first data set comprises acquiring the first data set representing a radiographic image of a sub-region of a body of the subject.

13. The method of claim 12, wherein acquiring the first data set representing a radiographic image of the sub-region of the body comprises acquiring the first data set representing at least one of an arm, a thigh, a torso, a foreleg, a forearm, and a head.

14. A system for determining anthropometric parameters of a subject, the system comprising:

a radiographic imaging device configured to acquire a radiographic image of the subject;

a processor; and a memory coupled to the processor, the memory storing instructions that, when executed by the processor, perform a set of operations comprising:

receiving from the radiographic imaging device a first data set representing a radiographic image of the subject, the first data having a first dimensionality;

transforming the first data set to a second data set having a second dimensionality, the second dimensionality being lower than the first dimensionality wherein the second data set is a compressed version of the first data set; and mapping the second data set to a third data set, the third data set representing a set of anthropometric parameters and having a third dimensionality wherein the third data set is a compressed representation of a 3D optical image data.

15. The system of claim 14, wherein the set of instructions comprises acquiring the first data set by acquiring an X-ray image data set.

16. The system of claim 14, further comprising an output device operatively coupled to the processor, wherein the set of instructions further comprises generating at the output device an output indicative of one or more of the anthropometric parameter represented by the third data set.

17. The system of claim 14, wherein the set of instructions comprises acquiring the first data set by acquiring the first data set representing a radiographic image of a sub-region of a body of the subject.

18. The system of claim 14, wherein the set of instructions comprises acquiring the first data set representing a radiographic image of the sub-region of the body by acquiring the first data set representing at least one of an arm, a thigh, a torso, a foreleg, a forearm, and a head.

19. A non-transient, computer-readable memory device storing instructions executable by a processor to perform a method comprising, receiving a first data set representing a radiographic image of the subject, the first data having a first dimensionality;

transforming the first data set to a second data set having a second dimensionality, the second dimensionality being lower than the first dimensionality wherein the second data set is a compressed version of the first data set; and mapping the second data set to a third data set, the third data set representing a set of anthropometric parameters and having a third dimensionality wherein the third data set is a compressed representation of a 3D optical image data.

20. The memory device of claim 19, wherein mapping the second data set to a third data set comprises:

mapping, using the processor, the second data set to a fourth data set, the fourth data set having a fourth dimensionality that is lower than the third dimensionality; and transforming, using the processor, the fourth data set to the third data set.

* * * * *